United States Patent
Fukahori et al.

(10) Patent No.: US 12,221,815 B2
(45) Date of Patent: Feb. 11, 2025

(54) DOOR OPENING PREVENTION SYSTEM FOR MOTOR VEHICLES

(71) Applicant: Honda Motor Co., Ltd., Tokyo (JP)

(72) Inventors: Takashi Fukahori, Saitama (JP); Yuichiro Saiki, Wako (JP); Khang C. Nguyen, Columbus, OH (US); Hiroshi Shingu, Walled Lake, MI (US)

(73) Assignee: Honda Motor Co., Ltd., Tokyo (JP)

( * ) Notice: Subject to any disclaimer, the term of this patent is extended or adjusted under 35 U.S.C. 154(b) by 443 days.

(21) Appl. No.: 17/690,278

(22) Filed: Mar. 9, 2022

(65) Prior Publication Data
US 2023/0287712 A1    Sep. 14, 2023

(51) Int. Cl.
*E05B 77/04* (2014.01)
*B60J 5/06* (2006.01)

(52) U.S. Cl.
CPC ............... *E05B 77/04* (2013.01); *B60J 5/06* (2013.01)

(58) Field of Classification Search
CPC ... B60J 5/042; B60J 5/0456; B60J 5/06; B60J 5/062; E05B 77/02; E05B 77/04
USPC .............................................. 296/146.1, 155
See application file for complete search history.

(56) References Cited

U.S. PATENT DOCUMENTS

| | | | |
|---|---|---|---|
| 5,967,595 A | 10/1999 | Heya et al. | |
| 7,390,054 B2 | 6/2008 | Suzuki | |
| 8,118,344 B2 | 2/2012 | Takaya et al. | |
| 8,371,640 B2 * | 2/2013 | Horneck | B60J 5/06 296/187.12 |
| 8,517,450 B2 * | 8/2013 | Lange | E05F 7/005 296/187.12 |
| 8,701,348 B2 | 4/2014 | Ito et al. | |
| 9,321,333 B2 | 4/2016 | Fukumoto et al. | |
| 11,795,736 B2 * | 10/2023 | Suzaki | B60J 5/043 |
| 2022/0289005 A1 * | 9/2022 | Saiki | E05D 15/1047 |
| 2022/0410673 A1 * | 12/2022 | Kanasugi | E05F 15/638 |

FOREIGN PATENT DOCUMENTS

| | | |
|---|---|---|
| CN | 110315941 A | 10/2019 |
| JP | 4823658 B2 | 11/2011 |
| KR | 100941819 B1 | 2/2010 |
| KR | 101220394 B1 | 1/2013 |
| WO | 2015182476 A1 | 12/2015 |

* cited by examiner

*Primary Examiner* — Jason S Daniels
(74) *Attorney, Agent, or Firm* — Plumsea Law Group, LLC (57) ABSTRACT

A system for preventing sliding vehicle doors from opening during collisions is disclosed. The system includes at least one roller assembly of a sliding door connected to a guiderail on a vehicle body. The roller assembly includes a protruding member that interfaces with a protrusion engaging member attached to the vehicle body. During normal operation, the protruding member clears the protrusion engaging member. During a collision in which the sliding door is pushed laterally outwards, the protruding member contacts the protrusion engaging member and stops the outward motion of the sliding door. In some cases, a vehicle includes corresponding protruding members and protrusion engaging members for both an upper roller assembly and a lower roller assembly of a sliding door.

20 Claims, 9 Drawing Sheets

DOOR OPENING PREVENTION SYSTEM FOR MOTOR VEHICLES

BACKGROUND

The embodiments relate generally to methods and systems for securing sliding doors in a vehicle.

Sliding doors in vehicles generally include roller assemblies that slide along guiderails mounted to the vehicle body. Sliding doors may latch when closed to ensure that the door does not accidentally open while the vehicle is driving. The latches may also to help keep the door from falling off the guiderails during a collision. Latching systems and other mechanisms for securing doors generally rely on components (such as striker plates) that are mounted to the vehicle body. In particular, sliding doors use latches that attach to striker plates on vertical beams or pillars of the vehicle body that are located adjacent the front and rear sides of the sliding door.

In vehicles with dual sliding doors, there may be no central pillar for the doors to latch on to when the doors are fully closed.

There is a need in the art for a system and method that addresses the shortcomings discussed above.

SUMMARY

Embodiments provide door opening prevention systems for motor vehicles.

In one aspect, a motor vehicle includes a vehicle body having an upper body portion and a lower body portion, a lower guiderail mounted to the lower body portion of the vehicle body, and a sliding door having an upper door portion and a lower door portion. The motor vehicle also includes a lower roller assembly having a first end attached to the lower door portion of the sliding door and the lower roller assembly having a second end connected to the lower guiderail so that the lower roller assembly can slide along the lower guiderail. The lower roller assembly further includes a protruding member. The motor vehicle also includes a protrusion engaging member attached to the vehicle body at the lower body portion. The sliding door is configured to move along a first trajectory when the sliding door is opened and closed by sliding along the lower track. The sliding door is configured to move along a second trajectory when a sufficient lateral force is applied along an interior side of the sliding door. The protruding member is configured to clear the protrusion engaging member when the sliding door moves along the first trajectory. The protruding member is configured to engage the protrusion engaging member and stop the motion of the sliding door when the sliding door moves along the second trajectory.

In another aspect, a motor vehicle includes a vehicle body having an upper body portion and a lower body portion, a lower guiderail mounted to the lower body portion of the vehicle body, a sliding door having an upper door portion and a lower door portion, and a lower roller assembly having a first end attached to the lower door portion of the sliding door and the lower roller assembly having a second end connected to the lower guiderail so that the lower roller assembly can slide along the lower guiderail. The lower roller assembly further includes a protruding member. The motor vehicle also includes a protrusion engaging member attached to the vehicle body at the lower body portion. The protruding member is configured to engage the protrusion engaging member to prevent the sliding door from opening during a collision.

In another aspect, a motor vehicle includes a vehicle body having an upper body portion and a lower body portion, a lower guiderail mounted to the lower body portion of the vehicle body and an upper guiderail mounted to the upper body portion of the vehicle body, and a sliding door having an upper door portion and a lower door portion. The motor vehicle also includes a lower roller assembly having a first end attached to the lower door portion of the sliding door and the lower roller assembly having a second end connected to the lower guiderail so that the lower roller assembly can slide along the lower guiderail and an upper roller assembly having a first end attached to the upper door portion of the sliding door and the upper roller assembly having a second end connected to the upper guiderail so that the upper roller assembly can slide along the upper guiderail. The lower roller assembly further includes a lower roller protruding member and the upper roller assembly further includes an upper roller protruding member. The motor vehicle also includes an upper protrusion engaging member attached to the vehicle body adjacent the upper guiderail and a lower protrusion engaging member attached to the vehicle body adjacent the lower guiderail. The upper roller protruding member is configured to engage the upper protrusion engaging member and the lower roller protruding member is configured to engage the lower protrusion engaging member to prevent the sliding door from opening during a collision.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Embodiments provide door opening prevention systems for motor vehicles. These systems may be used in sliding doors where only one side (for example, a forward or rearward side) is disposed adjacent to a portion of the vehicle body. In some cases, these systems may be used with vehicles including dual sliding doors, which lack a central pillar adjacent the area where the two doors meet. As described in further detail below, the door opening prevention systems include a protruding member attached to a roller assembly of the sliding door, and a corresponding protrusion engaging member attached to the vehicle body. The protruding member is configured to clear the protrusion engaging member when the sliding door is operating normally. However, in the event of a collision that imparts forces pushing the sliding door laterally outwards, the protruding member may contact the protrusion engaging member. This contact between the two members stops any further outward movement of the sliding door, and thereby prevents the sliding door from opening.

As also described in further detail below, the embodiments can include corresponding door opening prevention systems at an upper roller assembly and at a lower roller assembly of a sliding door. Using a separate door opening prevention system at each roller assembly may help ensure that neither a forward or rearward edge of the door opens or falls off of the vehicle body during a collision.

Figure 1:
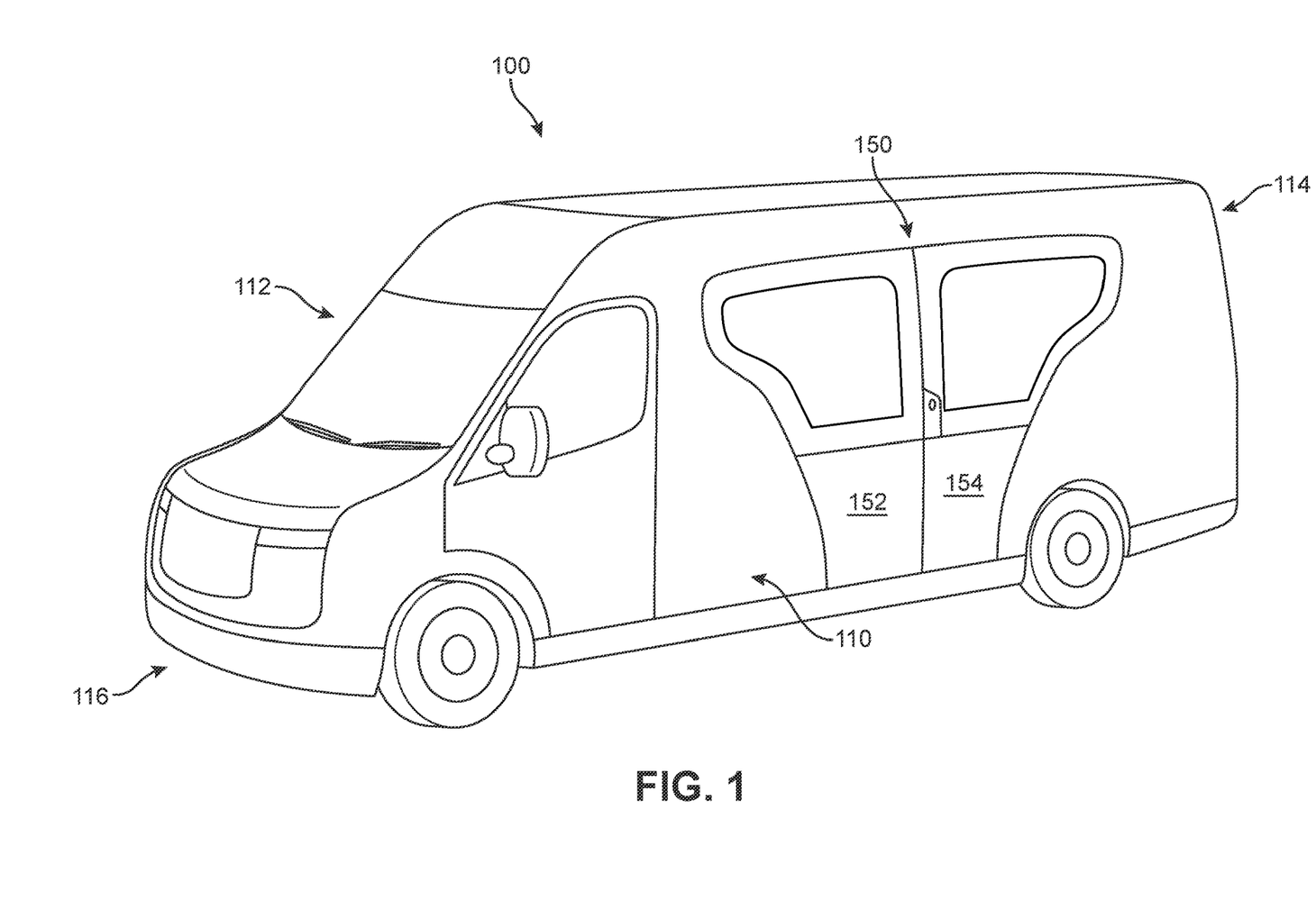
FIG. 1 is a schematic view of a motor vehicle including a dual sliding door assembly, according to an embodiment.

For purposes of introduction, an overview of one embodiment of the proposed systems and methods is illustrated with reference to FIGS. 1 and 2A-2B. Referring first to FIG. 1, a vehicle 100 includes a dual sliding door assembly 150.

Simply for purposes of reference, vehicle 100 may be understood to generally comprise a forward end portion ("forward end") 116, a rearward end portion ("rearward end") 114, a first side portion ("first side") 110 and a second side portion ("second side") 112.

For purposes of convenience, the description makes reference to a longitudinal direction, which extends along a length of a component, such as the length of the vehicle 100 between the forward end 116 and rearward end 114. Similarly, the description makes reference to a lateral direction, which extends along a width of each component, such as between the first lateral side 110 and second lateral side 112 of vehicle 100. In addition, the description makes reference to a vertical direction, which is a extending along a height of each component. For example, in a vehicle, the vertical direction runs from the roof structure to the floor of the vehicle.

Furthermore, the description makes reference to inner and outer directions. An inner direction is oriented towards an interior, or center, of a vehicle. An outer direction is oriented towards an exterior of a vehicle, and thus, away from the center of the vehicle.

The embodiments characterize some angles or directions as being oblique to some reference component, direction, or axis. As used herein, the term "oblique angle" refers to acute or obtuse angles. Put another way, oblique angles may be angles that are not multiples of 90 degrees. An oblique direction or orientation for a component refers to a direction or orientation that forms an oblique angle with some reference component, direction, or axis. For example, an object moving in an oblique direction is moving in a direction that is neither parallel to, or perpendicular to, a reference component or axis. A first direction that is oriented at an oblique angle to a second direction may be said to be "oriented obliquely" with respect to the second direction.

For clarity, vehicle 100 is depicted as a large passenger van. However, in other embodiments, a dual sliding door assembly, with the features described herein, could be incorporated into any suitable type of vehicle, including any car, van, truck, or bus. Furthermore, in some cases, a dual sliding door assembly could be incorporated into an autonomous vehicle ("AV") which could be used, for example, to drive around large numbers of passengers.

Dual sliding door assembly 150 can comprise a first sliding door 152 and a second sliding door 154. First sliding door 152 may also be referred to as a forward sliding door, as first sliding door 152 is located closer to forward end 116 of vehicle 100 than is second sliding door 154. Likewise, second sliding door 154 may also be referred to as a rearward sliding door, as second sliding door 154 is located close to rearward end 114 to vehicle 100 than is first sliding door 152.

Figure 2A:
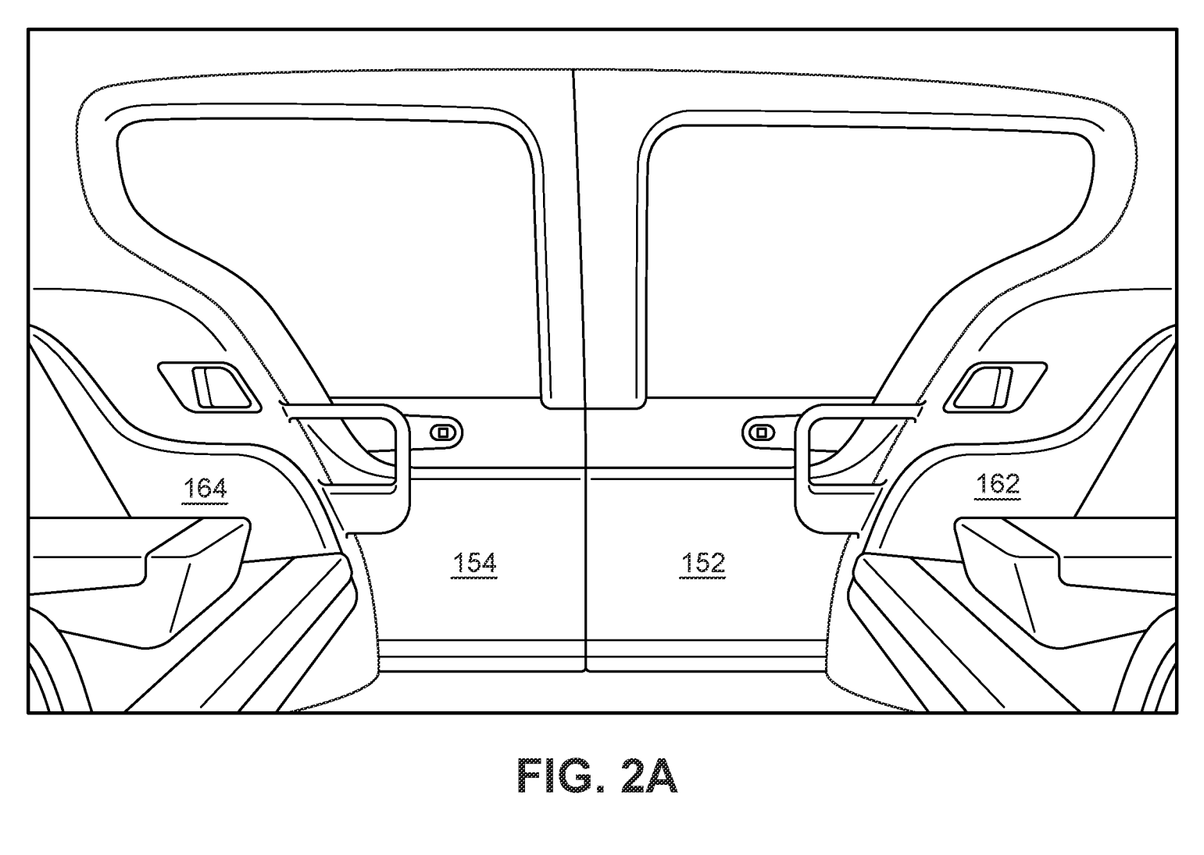
FIG. 2A is a schematic view of an interior portion of a motor vehicle with a dual sliding door assembly, according to an embodiment.
Figure 2B:
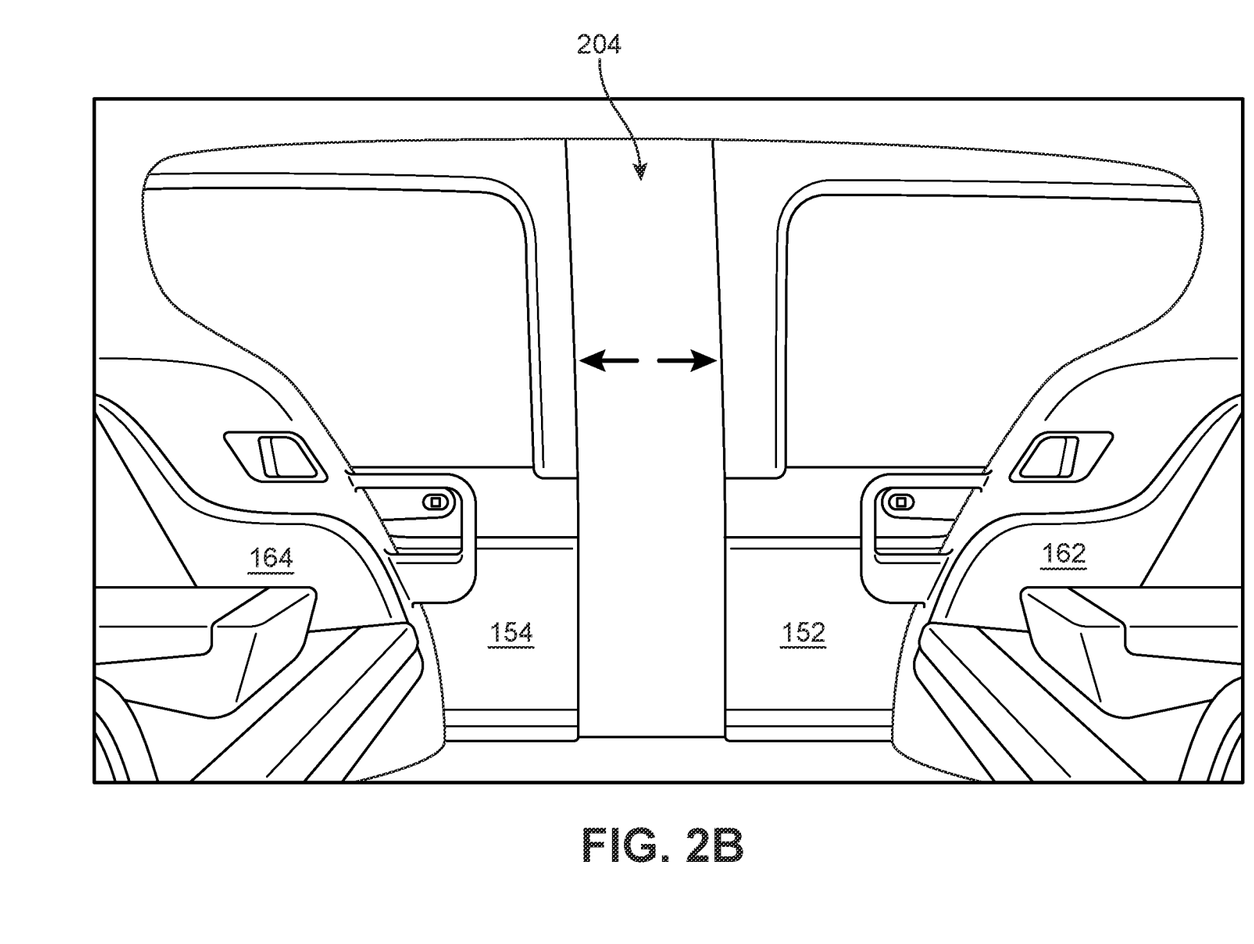
FIG. 2B is a schematic view of an interior portion of a motor vehicle with a dual sliding door assembly in a partially open configuration, according to an embodiment.

FIGS. 2A and 2B depict a view of dual sliding door assembly 150 as seen from within an interior cabin of vehicle 100. For purposes of illustration, partial views of two opposing seats (first seat 162 and second seat 164) are shown. In FIG. 2A, dual sliding door assembly 150 is shown in a "closed" position, in which first sliding door 152 and second sliding door 154 are positioned to cover the entirety of an opening within the body of vehicle 100. FIG. 2B depicts dual sliding door assembly 150 in a "partially open" position, in which first sliding door 152 and second sliding door 154 have moved away from one another and created a partial opening 204 between them. It may be appreciated that in a "fully open" position, which is not shown here, the first and second sliding doors may be separated so as to create an opening between them that is sufficient for occupants of vehicle 100 to pass through as they enter and exit the vehicle.

A relevant feature of the embodiments is the lack of any central pillar or beam positioned between the doors. For example, in a conventional minivan, a vehicle may have a central pillar disposed between a front side door (such as the driver's door) and a rear sliding door. Such a central pillar provides a fixed portion of the vehicle body to which both the front side door and the rear sliding door can latch. This latching can help prevent accidental opening of the doors while driving, and may also help keep the sliding door from falling off its tracks or rails in the event of a crash generating an outward force against the doors.

In the exemplary system, removing a central pillar between the opposing sliding doors maximizes the available opening through which occupants can enter and exit the vehicle when the dual sliding door assembly is in the fully open position.

In order to ensure the sliding doors of the dual sliding door assembly are still sufficiently secured in the event of a crash, the embodiments include roller locking systems disposed at appropriate locations on the sliding doors. Specifically, as described in further detail below, the embodiments provide roller locking systems that do not prevent a door from opening during normal operation of a sliding door, but which do engage if the door is pushed directly outward in deviation from its normal opening and closing trajectory.

Figure 3:
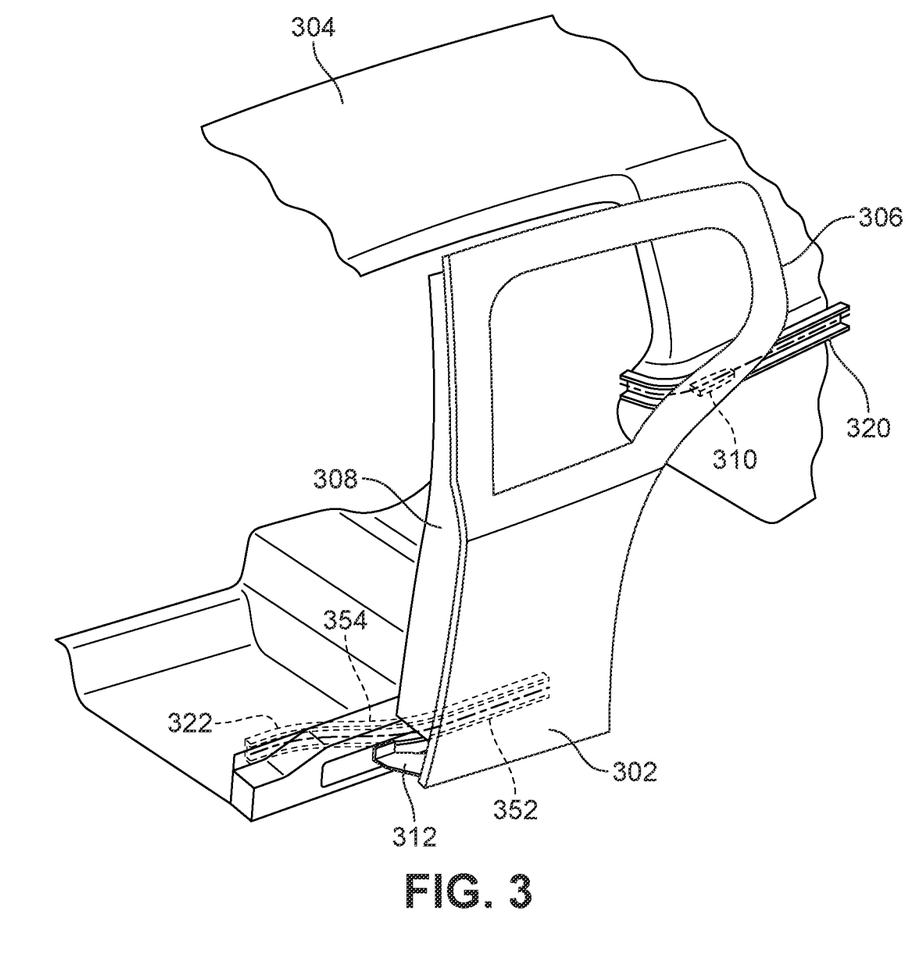
FIG. 3 is a schematic view of a sliding door and associated guiderails, according to an embodiment.

FIG. 3 is a schematic view intended to illustrate how a sliding door 302 is mounted to a vehicle body 304 using roller assemblies that move along guiderails. Although FIG. 3 depicts a rearward sliding door in isolation, the principles described herein are applicable to both forward sliding doors and rearward sliding doors, including, for example, forward sliding door 152 and rearward sliding door 154 of FIGS. 1, 2A, and 2B. Moreover, it may be appreciated that the particular configuration of vehicle body 304 and of sliding door 302 are intended to be generic, and similar configurations of roller assemblies and guiderails could be adapted to different vehicle geometries.

Sliding door 302 may include an upper roller assembly 310 (shown in phantom in FIG. 3) and a lower roller assembly 312. Each roller assembly is mounted to a corresponding guiderail on vehicle body 304. Specifically, upper roller assembly 310 is mounted to an upper guiderail 320 and lower roller assembly 312 is mounted to a lower guiderail 322 (shown in phantom in FIG. 3).

Upper roller assembly 310 is attached at a rearward portion 306 of sliding door 302. In particular, upper roller assembly 310 is positioned to engage upper guiderail 320 and stay engaged as sliding door 302 moves between a fully open and a fully closed position. Lower roller assembly 312 is attached at a forward portion 308 of sliding door 302. In particular, lower roller assembly 312 is positioned to engage lower guiderail 322 and stay engaged as sliding door 302 moves between the fully open and the fully closed position.

Each roller assembly may be permanently attached to the sliding door. Moreover, each roller assembly is configured to roll, or slide, along its corresponding guiderail as the door moves between the fully open and fully closed positions. The movement of the sliding door may be controlled by any suitable automatic sliding door actuating assembly. In some cases, such an actuating assembly could comprise motors and cables that can be used to drive the sliding door in either direction (that is, forwards and backwards) along the upper and lower guiderails.

The motion of each roller assembly along a corresponding guiderail defines a normal operating trajectory for that roller assembly. Here, the term "normal operating trajectory" refers to the trajectory of a roller assembly under normal operating conditions. Along straight segments of a guiderail (for example, straight segment 352 of lower guiderail 322), the motion of the roller assembly may generally be forwards and backwards, that is, along a longitudinal direction of the vehicle. Along curved segments of a guiderail (for example, curved segment 354 of lower guiderail 322), the motion of the roller assembly may include a combination of both longitudinal and lateral motion.

Figure 4:
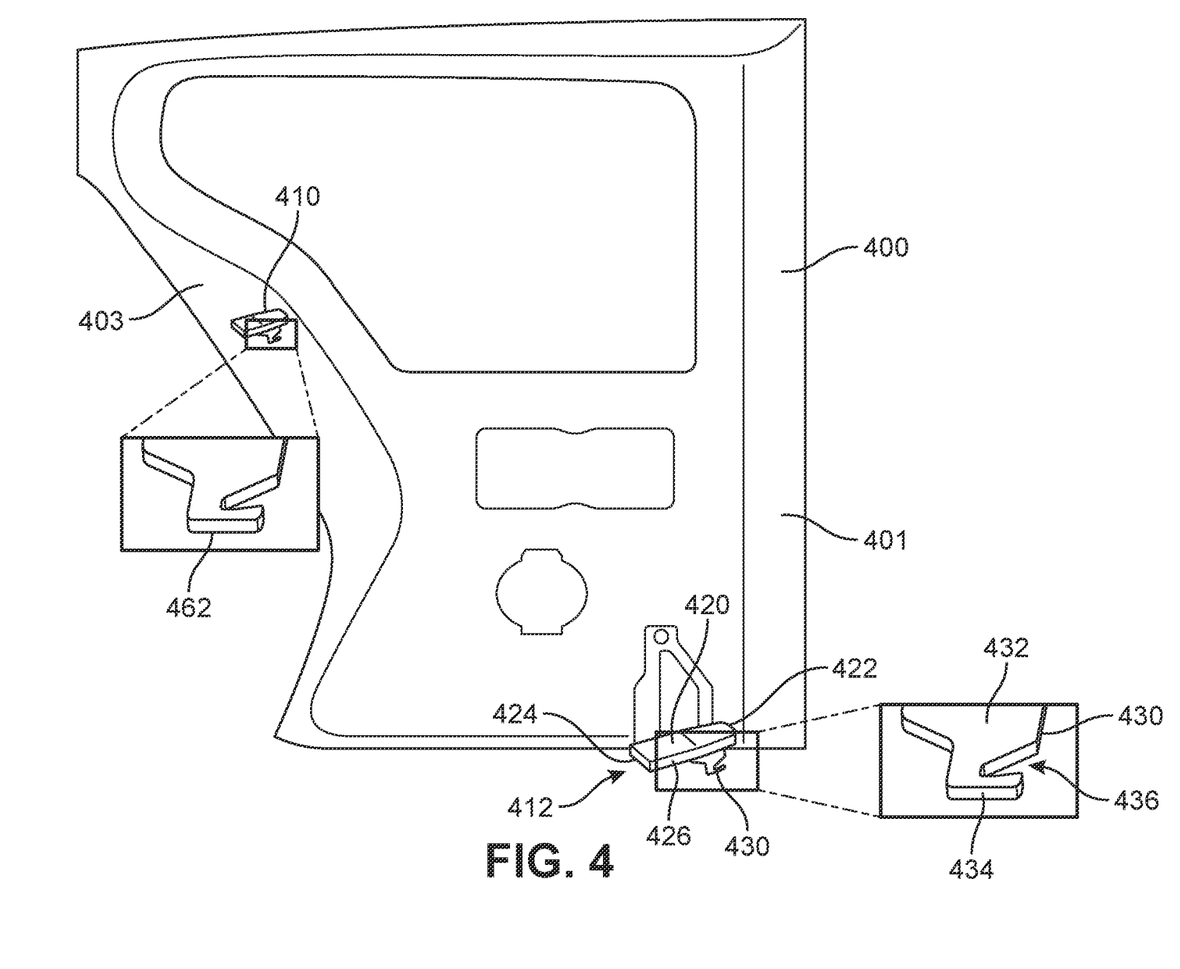
FIG. 4 is a schematic view of a sliding door including an upper roller assembly and a lower roller assembly, according to an embodiment.

FIG. 4 is a schematic interior view of a sliding door body 400 ("door body 400"), shown in isolation from a body of a vehicle. For clarity, door body 400 is shown without outer panels or molding. Referring to FIG. 4, door body 400 includes an upper roller assembly 410 and a lower roller assembly 412.

Lower roller assembly 412 comprises a roller assembly arm 420 that extends away from door body 400. That is, roller assembly arm 420 projects outwardly from door body 400. This allows lower roller assembly 412 to attach, or mount, to a corresponding lower guiderail (not shown) on the vehicle body. A first end 422 of roller assembly arm 422 may be permanently attached to door body 400, adjacent to forward end 401 of door body 400. An opposing second end 424 may include rollers (not shown) that engage, and roll along, the lower guiderail.

To help keep sliding door body 400 from opening or detaching from the vehicle body during a collision, roller assembly arm 420 can also include a protruding member 430, which is more clearly visible in a focal view of FIG. 4. Protruding member 430 may extend from an intermediate portion 426 of roller assembly arm 420, which is itself disposed between first end 422 and second end 424.

Protruding member 430 comprises a base portion 432 and a hook portion 434. Base portion 432 may extend away from intermediate portion 426 of roller arm assembly 420, and may either be fastened to intermediate portion 426 or else integrally formed with intermediate portion 426. Hook portion 434 may be associated with a notch 436. With this configuration, hook portion 434 can grasp, or otherwise engage, components as described in further detail below.

In some embodiments, upper roller assembly 410, attached at a rearward end 403 of door body 400, may be configured to mount to an upper guiderail. Upper roller assembly 410 could also be configured with a protruding member 462 that is capable of engaging other components. For purposes of clarity, protruding member 462 is shown as having a substantially similar size and shape as protruding member 430. However, in some cases, protruding member 462 may have a different shape and size, since the components interfacing with upper roller assembly 410 may be somewhat different in shape and size than the components interfacing with lower roller assembly 412.

A vehicle body may include components for interfacing with a protruding member of a roller assembly. In some cases, a vehicle body could include a protrusion engaging member. A protrusion engaging member could comprise any member or component that is permanently attached to a vehicle body and which further includes an engaging portion. The engaging portion can be engaged by the protruding member of a roller assembly in at least some circumstances (such as during certain types of collisions).

Figure 5:
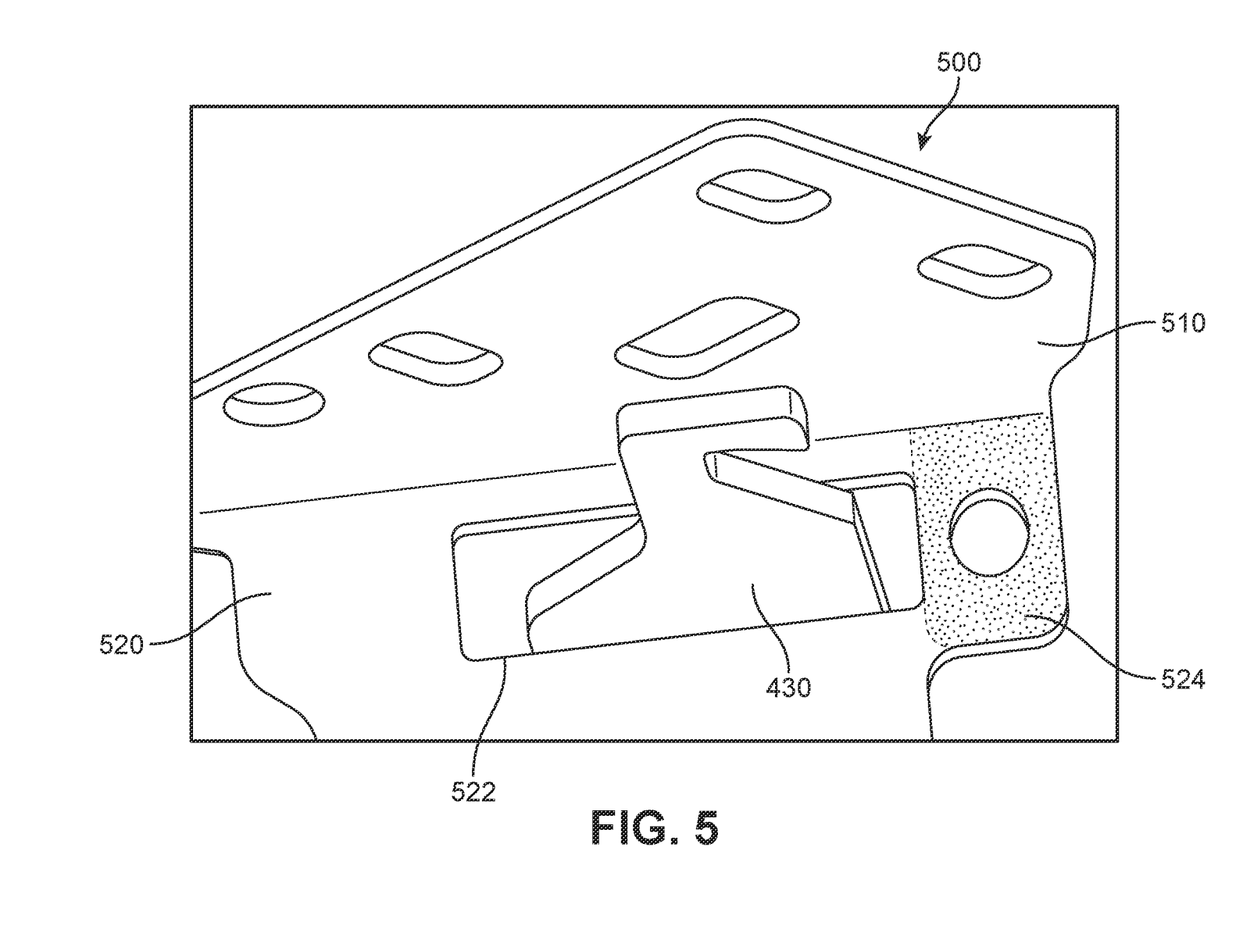
FIG. 5 is a schematic view of a protruding member of a roller assembly inserted through an opening of a protrusion engaging member, according to an embodiment.

FIG. 5 is a schematic view of a protrusion engaging member 500 that may interface with protruding member 430. As already described, protruding member 430 could protrude from a roller assembly (such as a lower roller assembly).

Protrusion engaging member 500 can be suitably shaped and sized to attach to a portion of a vehicle body adjacent an endpoint of motion for a roller assembly arm. In some cases, protrusion engaging member 500 may be positioned adjacent an end of a guiderail, so that as the roller assembly arm stops at the end of a corresponding guiderail, protruding member 430 may be disposed adjacent to some portion of protrusion engaging member 500. In some cases, for example, protrusion engaging member 500 may be attached at the end of a guiderail. In some cases, a part of protrusion engaging member 500 comprises a bracket for securing a guiderail to a vehicle body.

In the exemplary embodiment, protrusion engaging member 500 includes a base portion 510 that can be permanently attached to a vehicle body. Additionally, protrusion engaging member 500 includes a flange portion 520. In some cases, flange portion 520 includes an opening 522 and an engaging portion 524 (indicated with shading in FIG. 5). As described in further detail below, opening 522 is sized and shaped to receive protruding member 430 when a roller assembly moves along a normal operating trajectory). Moreover, engaging portion 524 is positioned along flange portion 520 to be engaged by protruding member 430 during a collision in which the force is directed to push the sliding door outwardly.

In the exemplary embodiment, engaging portion 524 is integrated as part of flange portion 520. This configuration may help reinforce the strength of engaging portion 524, and limit any deformation to engaging portion 524 during a collision.

Figure 6:
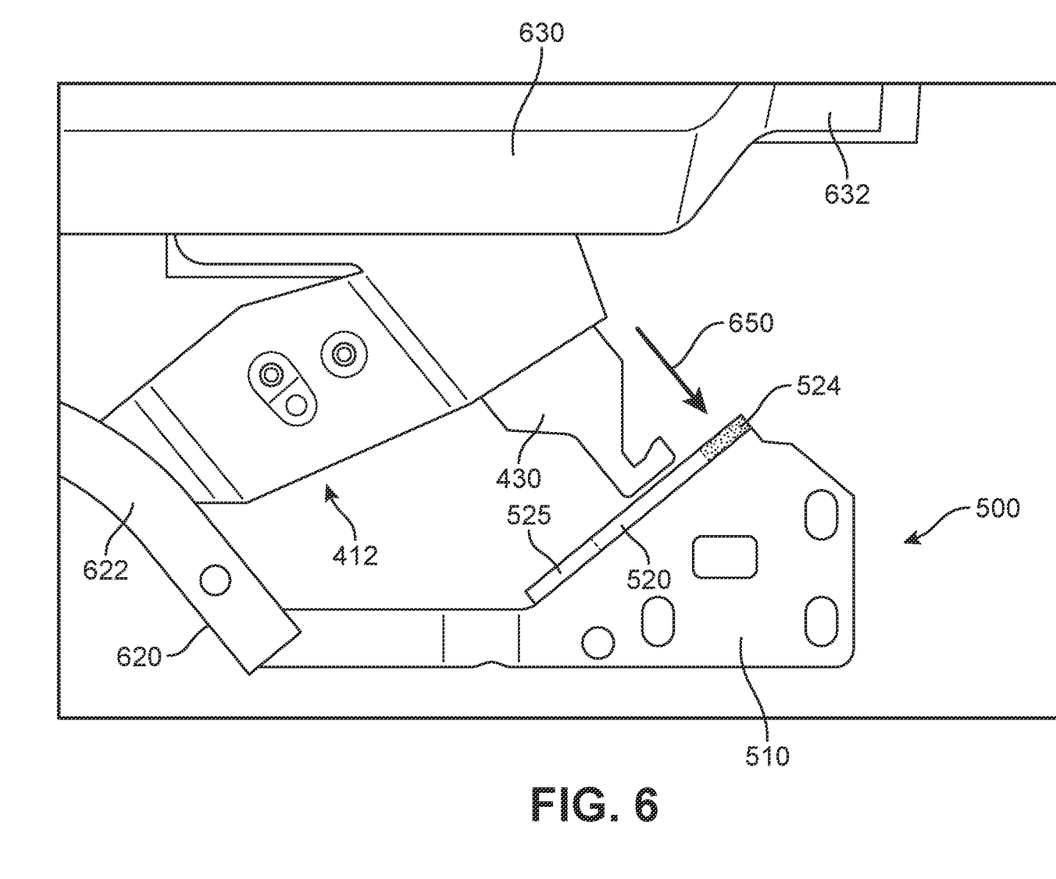
FIG. 6 is a schematic view of a roller assembly with a protruding member approaching a protrusion engaging member along a first trajectory, according to an embodiment.
Figure 7:
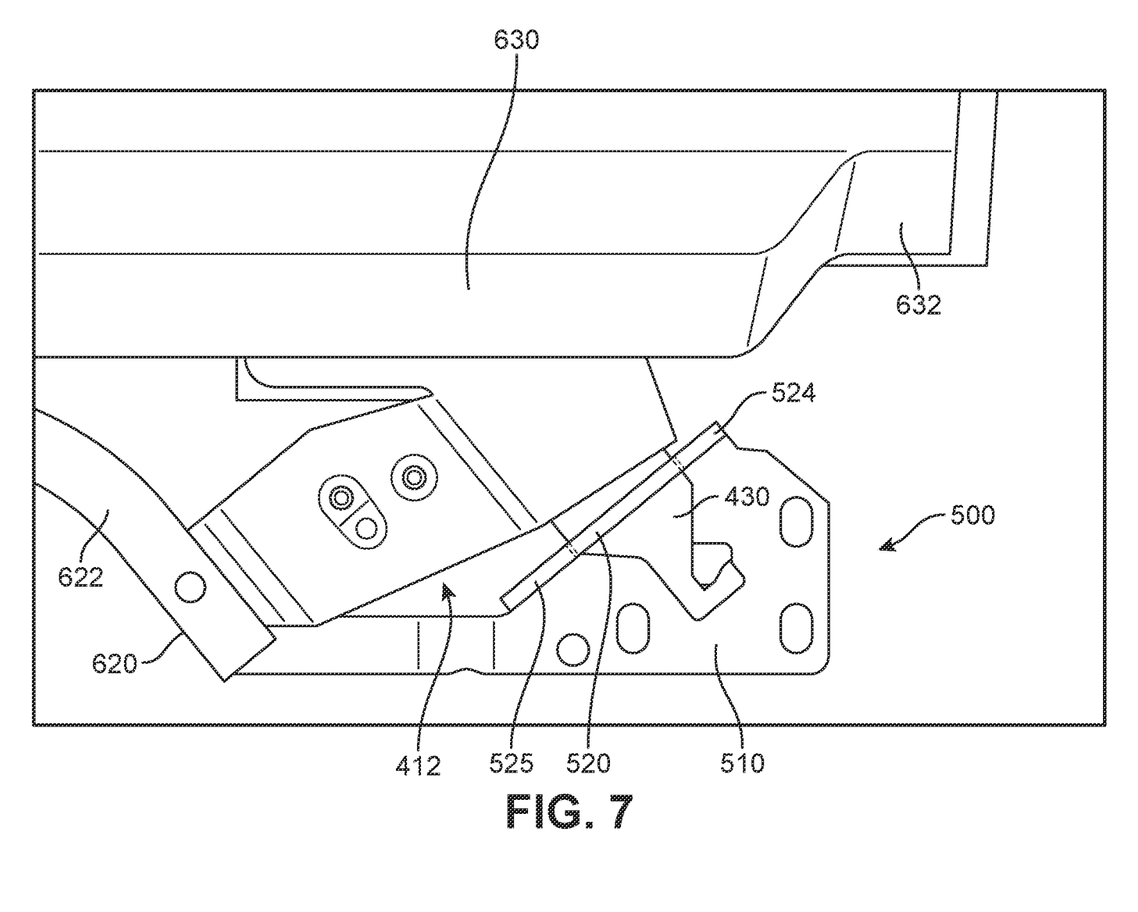
FIG. 7 is a schematic view of a roller assembly with a protruding member inserted through an opening in a protrusion engaging member, according to an embodiment.

FIGS. 6-7 are schematic top-down views showing the interface between protruding member 430 and a protrusion engaging member 500, as lower roller assembly 412 moves along a lower guiderail 620. In FIGS. 6-7, roller assembly 412 is permanently mounted to sliding door 630 (of which only a portion is shown in FIGS. 6-7) at one end and to lower guiderail 620 at an opposing end.

Because roller assembly 412 is attached at a forward end 632 of sliding door 630, this schematic top-down view shows roller assembly 412 (and sliding door 630) near the end of its forward motion along lower guiderail 620. Here, the curved portion 622 of lower guiderail 620 results in a motion for roller assembly 412 (and sliding door 430) that is that is both forward and laterally inwards (as sliding door 630 closes). Moreover, protruding member 430 may also move in a similar direction.

As lower roller assembly 412 reaches the endpoint of its motion, protruding member 430 travels along an oblique trajectory (or path) 650. Specifically, oblique trajectory 650 is oriented obliquely (that is, at an oblique angle) with respect to both a longitudinal direction of the vehicle and with respect to a lateral direction of the vehicle.

In the exemplary embodiment, an outer facing surface 525 of flange portion 520 is oriented in the same oblique direction defined by oblique trajectory 650. (More specifically, oblique trajectory 650 is normal to outer facing surface 525). This configuration allows protruding member 430 to pass through opening 522 of flange portion 520 (see FIG. 5) without interfering with engaging portion 524, as shown schematically in FIG. 7. In other words, during the normal operation of sliding door 630, there is no substantial contact between protruding member 430 and protrusion engaging member 500 (which includes engaging portion 524).

It may be appreciated that a similar motion occurs as sliding door 630 is opened, with protruding member 430 backing out of opening 522 along the same oblique path 650 that it entered.

During some collisions the impact may generate forces that tend to push a sliding door laterally outwards without any rearward component of motion. For example, in FIG. 8, a laterally outward force 800 is depicted schematically as pushing against sliding door 630. In the exemplary embodiment, as sliding door 630 is pushed laterally outwards (that is, away from the vehicle body), roller assembly 412 may travel in an approximately lateral direction, with respect to the vehicle body. In some cases, the forces may be sufficient to deform lower guiderail 620. Alternatively, in some cases, roller assembly 412 could become detached from lower guiderail 620.

Figure 8:
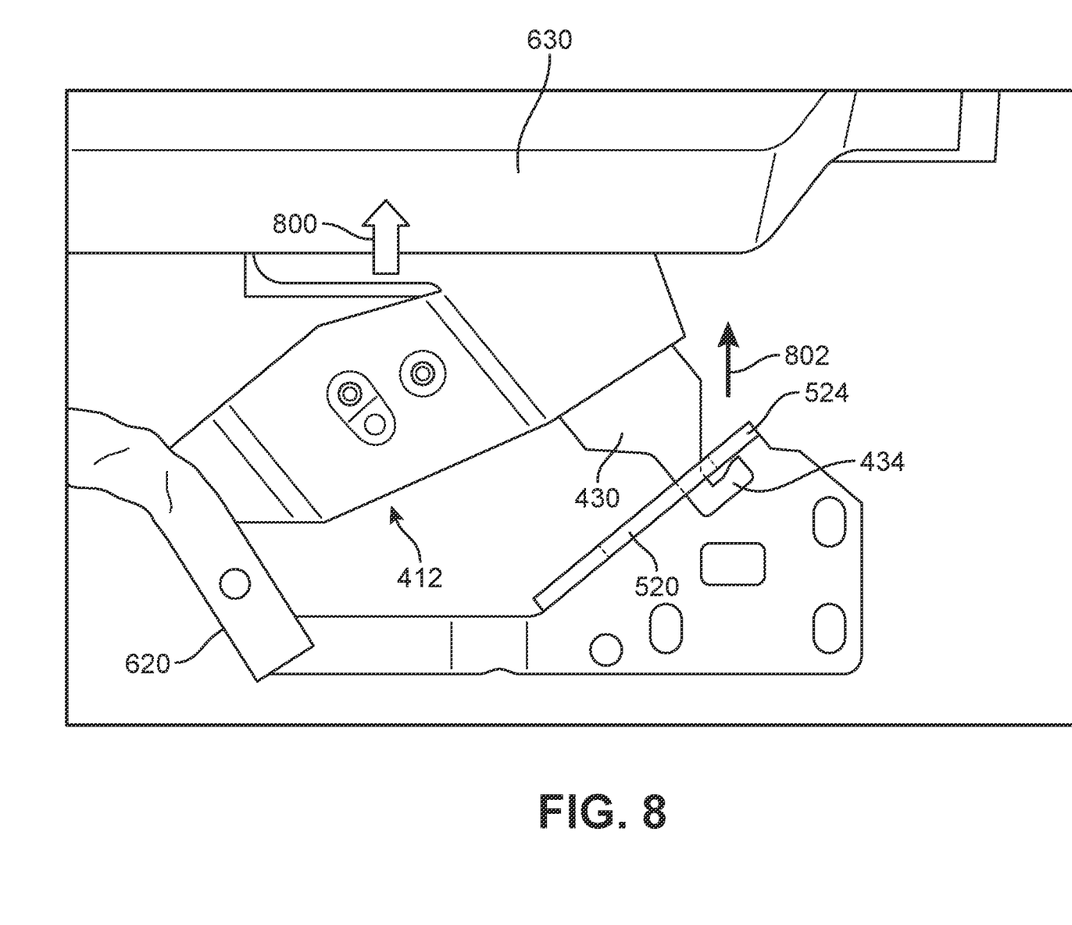
FIG. 8 is a schematic view of a roller assembly with a protruding member engaging with a protrusion engaging member, according to an embodiment.

As seen in FIG. 8, the laterally outward motion of roller assembly 412 may cause protruding member 430 to travel along a similar lateral trajectory 802. This lateral trajectory 802 is substantially different from the oblique trajectory 650 shown in FIG. 7. Moreover, as both flange portion 520 and protruding member 430 are oriented at oblique angles with respect to the longitudinal and lateral directions of the vehicle, this lateral motion results in protruding member 430 contacting flange portion 520. More specifically, hook portion 434 of protruding member 430 contacts engaging portion 524 of flange portion 520. This engagement interferes with, and stops, the outward motion of lower roller assembly 412. This keeps sliding door 630 from opening further and/or possibly detaching from the vehicle body entirely during the impact.

Although FIGS. 6-8 depict views of a protruding member on a lower roller assembly, it may be appreciated that these same principles may apply to an upper roller assembly (such as upper roller assembly 410 of FIG. 4). In particular, a corresponding protruding member (such as protruding member 462) on the upper roller assembly could be configured to engage a corresponding protrusion engaging member during a collision, in order to prevent the sliding door from opening. Moreover, it may be appreciated that in some embodiments, using the exemplary door opening prevention systems at both a lower roller assembly and an upper roller assembly may provide a more robust configuration that helps prevent the sliding door from opening during a collision.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the present embodiments.

The invention claimed is:

1. A motor vehicle, comprising:
   a vehicle body having an upper body portion and a lower body portion;
   a lower guiderail mounted to the lower body portion of the vehicle body;
   a sliding door having an upper door portion and a lower door portion;
   a lower roller assembly having a first end attached to the lower door portion of the sliding door and the lower roller assembly having a second end connected to the lower guiderail so that the lower roller assembly can slide along the lower guiderail;
   the lower roller assembly further including a protruding member;
   a protrusion engaging member attached to the vehicle body at the lower body portion, the protrusion engaging member including an opening, wherein an engaging portion of the protrusion engaging member closes the opening;
   wherein the sliding door is configured to move along a first trajectory when the sliding door is opened and closed by sliding along the lower guiderail;
   wherein the sliding door is configured to move along a second trajectory when a sufficient lateral force is applied along an interior side of the sliding door;
   wherein the protruding member is configured to pass through the opening of the protrusion engaging member when the sliding door moves along the first trajectory; and wherein the protruding member is configured to engage the engaging portion of the protrusion engaging member and stop the motion of the sliding door when the sliding door moves along the second trajectory.

2. The motor vehicle according to claim 1, wherein the protrusion engaging member is attached to the lower guiderail.

3. The motor vehicle according to claim 1, wherein the protrusion engaging member includes a base portion and a flange portion, and wherein the flange portion further includes the engaging portion that is configured to interfere with the protruding member when the sliding door moves along the second trajectory.

4. The motor vehicle according to claim 1, wherein the protruding member includes a hook portion.

5. The motor vehicle according to claim 3, wherein the vehicle body has a longitudinal direction and a lateral direction, and wherein the protruding member is oriented obliquely with respect to the longitudinal direction and to the lateral direction.

6. The motor vehicle according to claim 5, wherein the flange portion includes an outer flange surface, and wherein a normal direction to the outer flange surface is oriented obliquely with respect to the longitudinal direction and to the lateral direction.

7. A motor vehicle, comprising:
a vehicle body having an upper body portion and a lower body portion;
a lower guiderail mounted to the lower body portion of the vehicle body;
a sliding door having an upper door portion and a lower door portion;
a lower roller assembly having a first end attached to the lower door portion of the sliding door and the lower roller assembly having a second end connected to the lower guiderail so that the lower roller assembly can slide along the lower guiderail;
the lower roller assembly further including a protruding member;
a protrusion engaging member attached to the vehicle body at the lower body portion, the protrusion engaging member including an opening, wherein an engaging portion of the protrusion engaging member closes the opening; and
wherein the protruding member is configured to engage the engaging portion of the protrusion engaging member to prevent the sliding door from opening when a force is directed outwardly against the sliding door during a collision.

8. The motor vehicle according to claim 7, wherein the protrusion engaging member is attached to the lower guiderail.

9. The motor vehicle according to claim 7, wherein the protruding member includes a hook portion.

10. The motor vehicle according to claim 7, wherein the protrusion engaging member includes a base portion and a flange portion, and wherein the flange portion includes the engaging portion.

11. The motor vehicle according to claim 9, wherein the hook portion contacts the engaging portion when the protrusion engaging member prevents the sliding door from opening.

12. The motor vehicle according to claim 10, wherein the vehicle body has a longitudinal direction and a lateral direction, and wherein the protruding member is oriented obliquely with respect to the longitudinal direction and to the lateral direction.

13. The motor vehicle according to claim 12, wherein the flange portion includes an outer flange surface, and wherein a normal direction to the outer flange surface is oriented obliquely with respect to the longitudinal direction and to the lateral direction.

14. The motor vehicle according to claim 7, wherein the sliding door is configured to move along a first trajectory when the sliding door is opened and closed by sliding along the lower guiderail and wherein the sliding door is configured to move along a second trajectory when a sufficient lateral force is applied along an interior side of the sliding door.

15. The motor vehicle according to claim 14, wherein the protruding member is configured to pass through the opening of the protrusion engaging member when the sliding door moves along the first trajectory.

16. The motor vehicle according to claim 14, wherein the protruding member is configured to engage the protrusion engaging member and stop the motion of the sliding door when the sliding door moves along the second trajectory.

17. A motor vehicle, comprising:
a vehicle body having an upper body portion and a lower body portion;
a lower guiderail mounted to the lower body portion of the vehicle body and an upper guiderail mounted to the upper body portion of the vehicle body;
a sliding door having an upper door portion and a lower door portion;
a lower roller assembly having a first end attached to the lower door portion of the sliding door and the lower roller assembly having a second end connected to the lower guiderail so that the lower roller assembly can slide along the lower guiderail;
an upper roller assembly having a first end attached to the upper door portion of the sliding door and the upper roller assembly having a second end connected to the upper guiderail so that the upper roller assembly can slide along the upper guiderail;
the lower roller assembly further including a lower roller protruding member;
the upper roller assembly further including an upper roller protruding member;
an upper protrusion engaging member attached to the vehicle body adjacent the upper guiderail and a lower protrusion engaging member attached to the vehicle body adjacent the lower guiderail;
the upper protrusion engaging member including a first opening, wherein a first engaging portion of the upper protrusion engaging member closes the first opening;
the lower protrusion engaging member including a second opening, wherein a second engaging portion of the lower protrusion engaging member closes the second opening; and
wherein the upper roller protruding member is configured to engage the first engaging portion of the upper protrusion engaging member and the lower roller protruding member is configured to engage the second engaging portion of the lower protrusion engaging member to prevent the sliding door from opening during a collision.

18. The motor vehicle according to claim 17, wherein the lower roller protruding member has a hook-like geometry.

19. The motor vehicle according to claim 17, wherein the upper roller protruding member has a hook-like geometry.

20. The motor vehicle according to claim 17, wherein the motor vehicle includes a dual sliding door assembly, comprising a forward sliding door and a rearward sliding door, and wherein the sliding door is one of the forward sliding door or the rearward sliding door.

\* \* \* \* \*